March 15, 1938. J. T. McCAFFREY 2,111,457
INSULATION APPLYING MACHINE
Filed March 5, 1937 3 Sheets-Sheet 1
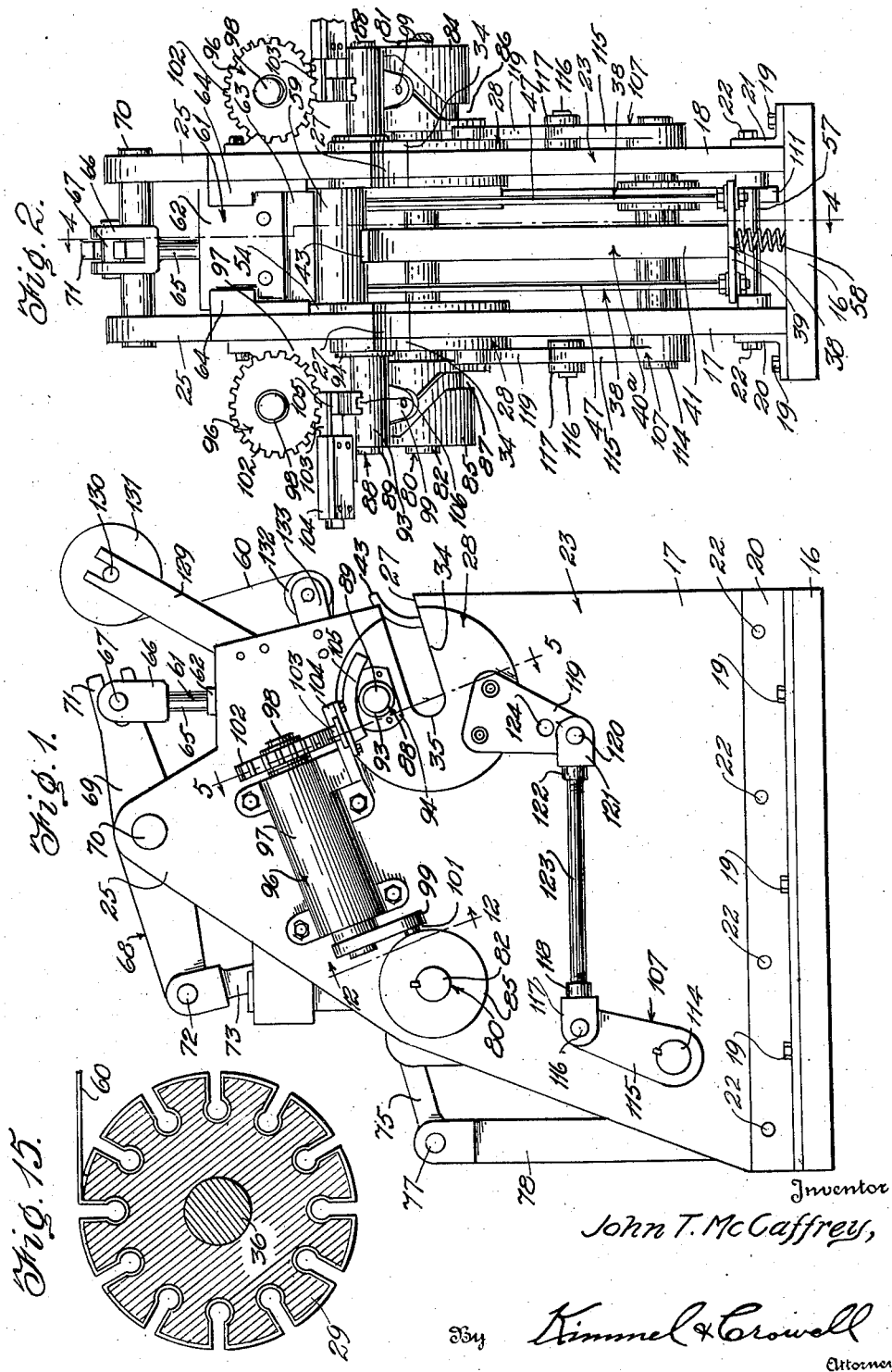
Inventor
John T. McCaffrey,
By Kimmel & Crowell
Attorneys

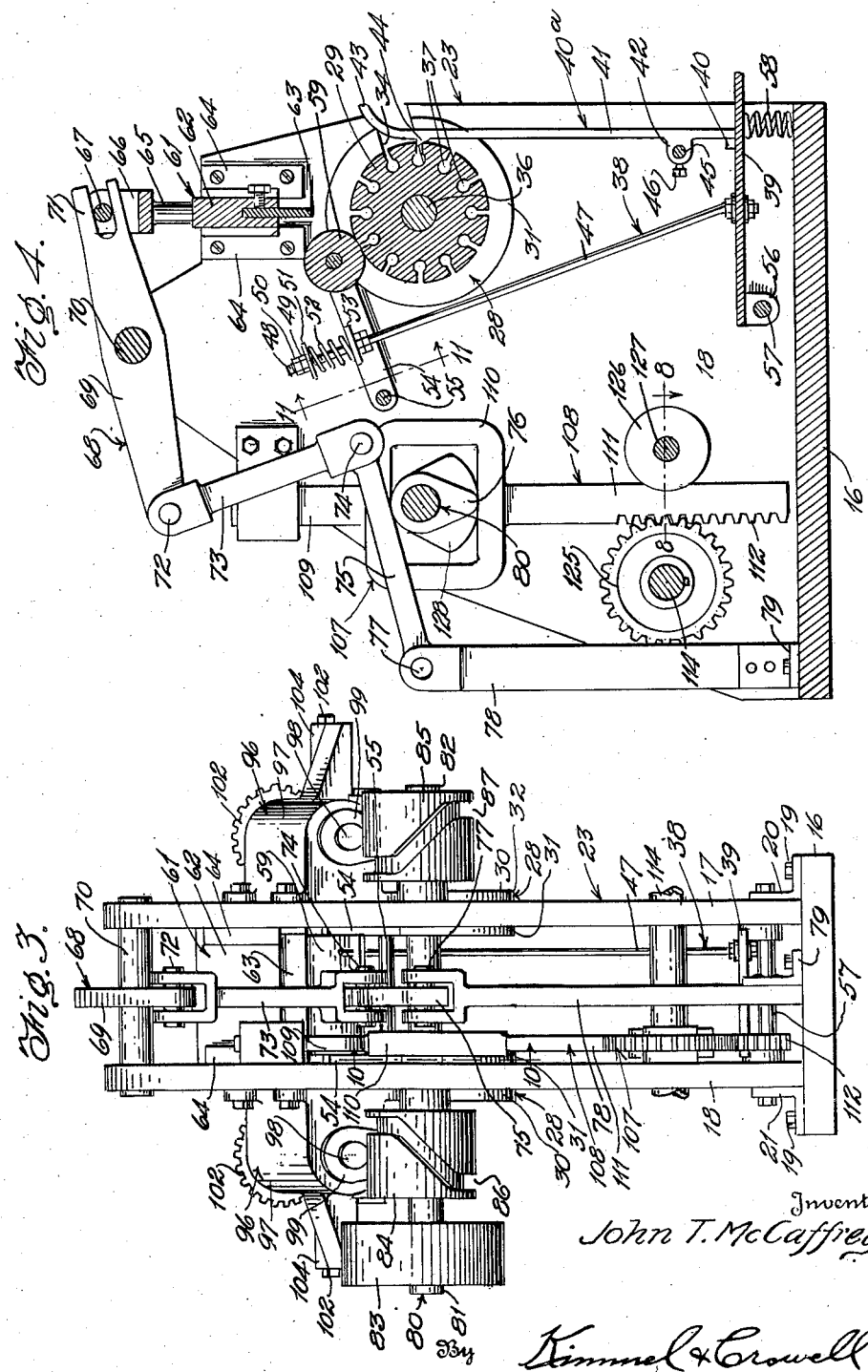

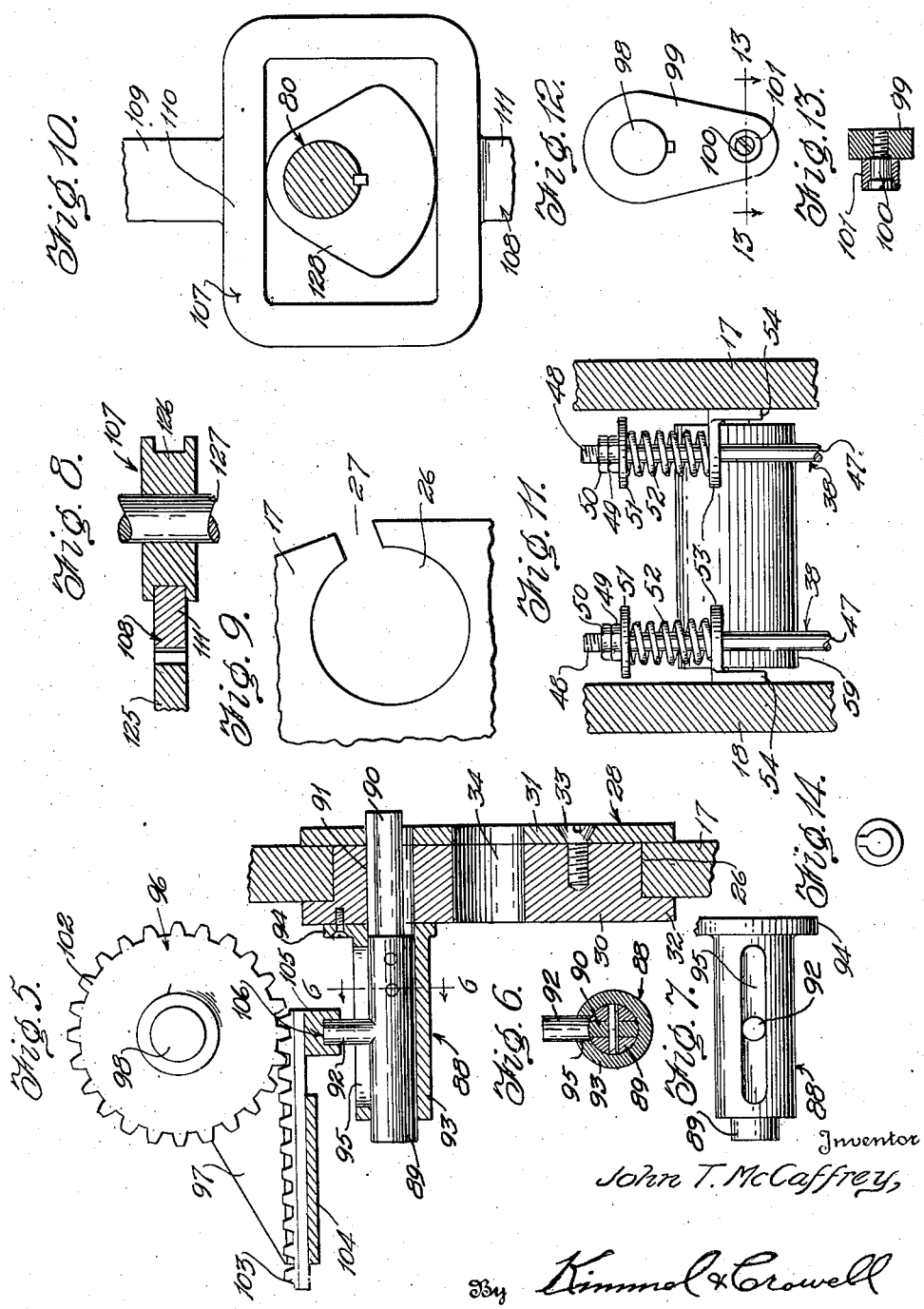

Patented Mar. 15, 1938

2,111,457

UNITED STATES PATENT OFFICE 2,111,457

INSULATION APPLYING MACHINE

John T. McCaffrey, Birmingham, Ala., assignor of fifty-five percent to Standard Armature Parts Co., Birmingham, Ala.

Application March 5, 1937, Serial No. 129,290

10 Claims. (Cl. 29—84)

This invention relates to an insulation applying machine designed primarily for insulating the cores of armatures of motors employed in motor vehicles, but it is to be understood that a machine, in accordance with this invention is to be employed in any connection for which it may be found applicable, and the invention has for its object to provide, in a manner as hereinafter set forth, a machine of the class referred to for snugly applying to the walls of the slots of an armature core, in which the armature winding wires are received, an insulating medium in the form of a continuous strip disposed in encompassing relation with respect to the core.

A further object of the invention is to provide, in a manner as hereinafter set forth, a machine of the class referred to including means whereby it is capable of being used with respect to armature cores having different numbers of slots.

A further object of the invention is to provide, in a manner as hereinafter set forth, a machine of the class referred to, including an intermittently operable inserter element for successively forcing parts of an insulating medium in the slots of the core and a pair of oppositely travelling former elements acting in unison successively on the successive inserted parts of the insulating medium to cause said parts to snugly engage throughout the walls of the slots.

A further object of the invention resides in the new and novel means for intermittently revolving the armature core to successively dispose the slots thereof in position to be insulated.

A further object of the invention is to provide, in a manner as hereinafter set forth, a machine of the class referred to including means for smoothing the strip of insulation material against the periphery of the armature core simultaneously with the insulating of the slots.

Further objects of the invention are to provide, in a manner as hereinafter referred to, a machine for insulating armature cores which is comparatively simple in its construction, strong, durable, compact, thoroughly efficient in its use, expeditious in its action, readily assembled, conveniently repaired when occasion requires and comparatively inexpensive to set up.

To the above ends essentially and to others which may hereinafter appear, the invention consists of the novel construction, combination and arrangement of parts as will be more specifically described and are as illustrated in the accompanying drawings wherein is shown an embodiment of the invention, but it is to be understood that changes, variations and modifications may be resorted to which fall within the scope of the invention as claimed.

In the drawings:

Figure 1 is a side elevation,

Figure 2 is a fragmentary view in elevation looking towards the front of the machine, Figure 3 is a fragmentary view in rear elevation, Figure 4 is a section on line 4—4, Figure 2, with the armature core arranged in the machine, Figure 5 is a section on line 5—5, Figure 1, Figure 6 is a section on line 6—6, Figure 5, Figure 7 is a detail in top plan illustrating a former element housing, Figure 8 is a section on line 8—8, Figure 4, Figure 9 is a fragmentary view in side elevation showing the form of side plates employed, Figure 10 is a section on line 10—10, Figure 3, Figure 11 is a fragmentary view in front elevation illustrating the tensioning means for the smoothing roll and slot positioning pawl or element, Figure 12 is a detail section on line 12—12, Figure 1, Figure 13 is a section on line 13—13, Figure 12, Figure 14 is an end view illustrating the shape of the former-elements, and Figure 15 is a cross sectional view of the armature core after being insulated by the machine.

The machine includes a base plate 16 of rectangular contour upon which is mounted in parallel spaced relation a pair of upstanding side plates 17, 18 of like form. The plates 17, 18 are spaced inwardly adjacent to the side edges of plate 16. Anchored upon the plate 16, by the holdfast means 19 is a pair of oppositely disposed angle bars 20, 21 which are anchored by the holdfast means 22 to the plates 17, 18 respectively. The plates 16, 17 and 18 and bars 20, 21 provide a supporting structure generally indicated at 23.

The plates 17, 18, each of which (best shown in Figures 1, 2, 4, 5 and 9) is formed at its top edge with a tapered extension 25, a circular opening 26 intermediate its ends forwardly of its vertical center and an inclined cutout 27 forming an entrance passage for opening 26. The extensions 25, openings 26 and cutouts 27 of the plates 17, 18 align.

Revolubly mounted in each opening 26 (best shown in Figures 1, 2 and 5) is what may be termed an oscillatory holder 28. The holders 28 coact to intermittently revolve and support the armature core 29 (Figure 4) which is to be insulated. The holders 28 are of like form, but are oppositely disposed. Each holder consists of a circular outer and a circular inner section 30, 31 respectively. The section 30 is formed with an annular peripheral flange 32 at its outer end. The section 30 has its non-flanged part seated in an opening 26. The flange 32 of section 30 is positioned against the outer face of a side plate (Figure 5). The section 31 is secured against the inner end of section 30 by the countersunk holdfast means 33. The diameter of section 31 corresponds to that of flange 32. The flanges 32 and the sections 31 couple the holders to the side walls. Each holder is formed with an inclined cutout 34 open at its outer end and having a closed rounded inner end 35. The cutout 34 extends inwardly from the edge of the holder. The axis of the holder is positioned adjacent to the closed inner end 35 of the cutout. The cutouts of the holders are adapted to register at their outer ends with the inner ends of the cutouts 27 to enable for the insertion of the end terminal portions of a supporting shaft 36, against the inner ends 35 of cutouts 34, for the armature core 29 whereby the latter will be positioned in the machine for the purpose of applying insulation thereto. When the armature core 29 is arranged in the machine, the ends thereof are to frictionally bind against the sections 31 of the holders 28 to provide for the holders carrying the armature therewith when the holders are shifted in an anti-clockwise direction. The holders act to intermittently revolve the armature in an anti-clockwise direction to successively position the peripheral slots 37 of the armature core 29 for the purpose of insulating the walls of the slots.

Clockwise movement of the armature core is prevented by a spring controlled structure 38 arranged between the front portions of the plates 17, 18 and consisting of a resiliently supported pivoted horizontally disposed treadle 39 arranged over, extended outwardly from and disposed in proximity to the front portion of plate 16, a stop or abutment 40 on and inwardly of the outer end of treadle 39, a vertically disposed pawl 40ᵃ including an elongated shank 41 having an inwardly extending apertured ear 42 near its lower end, an outwardly curved upper terminal portion 43 and an inwardly extending tapered nose 44 in proximity to portion 43, a rotatable shaft 45 journaled in the plates 17, 18 and extending through ear 42, a binding screw 46 for fixing shaft 45 to ear 42, a pair of spaced parallel upstanding rearwardly inclined rods 47 provided with threaded upper terminal portions 48 (Figure 11), holding and clamping nuts 49, 50 respectively on portions 48, stops 51 bearing against nuts 49, coiled springs 52 encompassing rods 47 and bearing at their upper ends against stops 51, abutments 53 bearing against the lower ends of springs 52, upwardly inclined forwardly extending pivoted arms 54 which carry the abutments 53, a shaft 55 (Figure 4) extending through the rear ends of arms 54 and connected to the plates 17, 18, depending apertured lugs 56 on the rear end of treadle 39, a shaft 57 extending through the lugs 56 and connected to plates 17, 18 and a spring 58 interposed between treadle 39 and plate 16. The structure 38 not only prevents clockwise movement of the armature 29, but further acts to normally maintain a combined holding and smoothing roll 59 in juxtaposition to the top of armature 29. The roll 59 acts to smooth and hold down on the periphery of the armature core 29 those portions of the strip 60 of insulation between the insulated slots 37. The shank 41 of pawl 40ᵃ normally seats on treadle 39 against the front of abutment 40. The latter prevents the upper portion of pawl 40ᵃ from shifting outwardly. The nose 44 normally extends towards the armature core 29 to engage in a slot 37 and when so engaged prevents clockwise movement of said core. The springs 52, 58 normally tend to hold the nose 44 in the path of the leading side wall of a slot 37 whereby the leading wall of the latter in connection with the nose act to prevent clockwise movement of core 29. When it is desired to release core 29 from pawl 40ᵃ, the treadle 39 is lowered and the end terminal part 43 of the pawl grasped, after which the pawl 40ᵃ is swung outwardly on its pivot, as the treadle 39 has been lowered to permit of the lower end of pawl 40ᵃ clearing abutment 39.

The machine includes an inserter-element 61 which functions to successively insert spaced parts of the insulation strip 60 into the slots 37 of the armature core 29. The lengthwise center of each slot aligns with the axis of the core 29. The element 61 is arranged above the insulating strip 60 and in alignment with the longitudinal median of core 29. The element 61 consists of a vertically movable or reciprocatory carrier 62 having detachably secured therein and depending therefrom a blade-like plunger 63 corresponding in length to that of a core slot and of a thickness to readily enter the core slot for the purpose of inserting a part of strip 60 into the slot. Initially the strip 60 is extended into the machine and has its outer end clamped against the periphery of core 29 by the roller 59 which is arranged between the holders 28. The carrier 62 travels between spaced guides 64 anchored to the upper portion of the inner faces of the plates 17, 18. Secured to the top of carrier 62, centrally thereof is a vertical stem 65 provided at its upper end with a yoke 66 having extending transversely thereof a shaft 67. The latter is spaced above the bottom of yoke 66.

There is associated with the element 61 a cam actuated gravity returnable means 68 for reciprocating it. The said means 68 consists of an oscillatory lever 69 pivotally mounted intermediate its ends upon a stationary shaft 70 carried by the extensions 25. The forward end of lever 69 is bifurcated as at 71 for straddling the shaft 67. The rear end of lever 69 has pivotally connected thereto, as at 72 the upper end of a depending link 73. The lower end of link 73 is pivotally connected, as at 74, to the forward end of an oscillatory lever 75 arranged in the path of a quick acting cam 76 which is employed for actuating the means 68 in one direction for the purpose of lowering element 61. The latter is moved upwardly on the gravity return of the means 68. The lever 75 permanently rides against cam 76 and has its rear end pivotally connected as at 77 to the upper end of a standard 78 anchored at its lower end, as at 79 upon the rear of plate 16.

The operating shaft of the machine is indicated at 80 and it is journaled in and of a length to extend laterally from the plates 17, 18. The shaft 80 is arranged in the supporting structure 23 rearwardly of, aligns with and is spaced from the holders 28. The cam 76 is fixed to shaft 80 approximately centrally between the plates 17 and 18 and aligns with standard 78. The shaft 80 extends a greater distance outwardly from plate 17 than the distance it extends from the plate 18. The portions of shaft 80 which extend outwardly from plates 17, 18 are indicated respectively at 81, 82. Mounted on shaft portion 81 is driving pulley 83 for shaft 80. The pulley 83 is to be suitably connected to a prime mover not shown. Keyed to the shaft portions 81, 82 for the purpose of being bodily rotated with shaft 80 are cam cylinders 84, 85 respectively, having their grooves indicated at 86, 87 respectively. The cam cylinders are provided for actuating an operating mechanism to be referred to for a pair of oppositely movable former-elements 88 to be referred to. The function of such former-elements is to provide for the parts of the strip 60 of insulation which are extended into the slots of the armature core to snugly engage the walls of the slots.

The former-elements are of like construction, oppositely disposed with respect to each other and each of which consists of a slidably mounted cylindrical shank 89 (Figure 5) having connected thereto and extending from its inner end a forming head 90 which is to correspond in contour to the shape of the slots in the armature core 29. As shown by way of example the slots 37 are substantially of key-hole shaped contour and the heads 90 are of like form. The heads 90 are shifted simultaneously in opposite directions through openings 91 formed in the holders 28 into that part of the strip 60 which has been inserted into a slot 37 by element 61. The heads 90 travel towards each other for the purpose of extending the part aforesaid to snugly engage the walls of the slot, or in other words, to conform such part to the contour of the slot. When the heads 90 are moved towards each other, the shanks 89 extend into the openings 91 in the holders. The heads 90 are of such length as to provide for action throughout on the inserted part of strip 60. The shank 89 of each element 88 is formed with a pin 92 for a purpose to be referred to. Each element 88 includes an annular casing 93 which is open at each end, provided at its forward end with an outwardly directed flange 94 and lengthwise of its top with a slot 95 through which extends the pin 92. The flanges 94 of the casings 93 are secured to the outer faces of the holders 28 and having their inner ends register with the walls of the openings 91. The shanks 89 are to extend from the rear ends of the casings 93 when elements 88 are in inactive position. The casings 93 bodily move with the holders 28 and carry the shanks 89 therewith.

There is associated with each former-element 88 an actuatable shifting mechanism 96 for the combined shank and head of such element 88. The mechanisms 96 act to simultaneously move the forming-heads away from each other, or in other words, the mechanisms 96 simultaneously extend and retract the heads 90 into and out of the part of strip 60 which has been inserted in a slot 37. The mechanisms 96 are simultaneously actuated from the cam cylinders 84, 85, arranged exteriorly of, in lateral relation with respect to and are anchored to the sides of the structure 23. Each mechanism 96 consists of a housing 97 which inclines upwardly throughout from its rear to its outer end, a rotatable shaft 98 disposed at the same inclination mounted in and extending from each end of the housing 97, a rock-arm 99 anchored at its upper end to the lower end of shaft 98 and provided at its lower end with a combined support and retainer 100 for a laterally disposed revoluble roller 101, a gear wheel 102 on the upper end of shaft 98, a slidable rack 103 shifted from gear 102, holding means 104 for the rack depending from housing 97 and an arcuate arm 105 suspended from and disposed at right angles to the outer end of rack 103. The lower face of arm 105 is grooved lengthwise thereof, as as 106. The roller 101 of a mechanism 96 travels in the groove of a cam cylinder 84 or 85 and provides for the rocking of arm 99 in opposite directions whereby the shaft 98 will be rocked in like directions resulting in revolving in opposite directions of the gear 102 whereby the rack 103 will be reciprocated. The pin 92 of a former-element 88 is extended into the groove 106 of an arm 105. When gear 102 moves in an anti-clockwise direction, the rack 103 will be shifted towards a former-element 88 and the arm 105 will move the forming-head 90 of the element 88 into the part of strip 60 which has been inserted into a slot 37 of the core 29. When the gear 102 moves in a clockwise direction, the rack 103 moves away from a former-element 88, and as arm 105 is carried therewith, the forming-head of such element will be withdrawn from the part aforesaid of strip 60. The grooves 106 of the arms 105 not only provide for receiving the pins 92 of the former-elements 88 for connecting mechanisms 96 with and to operate elements 88, but also act to permit of the elements 88 being bodily carried with the holders 28 when these latter are intermittently shifted or oscillated in the side plates 17, 18.

There is associated with each holder 28 a cam actuated impulse mechanism 107 for the purpose of oppositely shifting or oscillating the holders in unison to successively position the slots 37 in the core 29 in alignment with the plunger 63 of the inserter element 61 whereby on the lowering movement of the plunger 63 a part of the strip 60 will be inserted in a core slot. The operation of element 61 is so timed with respect to the operation of the elements 88 whereby these latter will enter the inserted part of strip 60 immediately after the plunger 63 clears the slot. The operation of elements 88 with respect to mechanism 107 is so timed that the operation of these latter to give opposite impulses to the holders will be immediately after the elements 88 clear the inserted part of the strip 60 which they had operated upon. The cam actuated mechanisms 107 are of like construction and which have common thereto an upstanding vertically movable member 108 having a smooth upper portion 109, an intermediate skeleton portion 110 of rectangular contour and a lower portion 111 of greater length than the upper portion 108. The portions 109, 111 merge into the top and bottom of the intermediate portion 110 centrally of the latter. The portions 109, 111 are of rectangular contour in sectional plan. The rear edge of portion 111 is toothed as at 112 to provide a rack. The portion 109 extends into a guide bracket 113 secured to the upper portion of the inner face of plate 18. The member 108 is arranged in proximity to the inner face of plate 18. Journaled in the rear of plates 17, 18 in proximity to plate 16 is a shaft 114 which extends outwardly from plates 17, 18. Each mechanism 107 consists of a crank arm 115 (Figure 2), carried by shaft 114. The upper end of arm 115 is pivotally connected, as at 116 to a yoke 117 having extended from the base thereof a sleeve 118 which is internally threaded. Fixedly secured eccentrically to and depending from the outer end of each holder 28 is an impulse arm 119 for the latter. The lower end of arm 119 is pivotally connected, as at 120 to a yoke 121 having its base formed with a laterally disposed sleeve 122. Adjustably connected to the sleeves 118, 122 is a coupling bar 123. The arm 119 is formed with a plurality of openings 124, only one shown, for the purpose of connecting yoke 121 at different points of arm 119 to vary the impulse imparted therefrom to a holder. The length of the impulse is to depend upon the number of slots 37 in the armature core 28. The pivot for yoke 121 is extended through the outer one of the openings 124. Carried by the shaft 114 and permanently meshing with the teeth 112 is a gear 125. The teeth 112 are permanently maintained in mesh with gear 125 by a grooved roller 126 revolubly mounted on a shaft 127 secured to the plates 17, 18 and riding against the non-toothed edge lower portion 111 of member 108.

The cam for operating mechanism 107 is indicated at 128 and is carried by the shaft 80. The cam 128 is arranged within the skeleton intermediate portion 110 and successively rides against the top and bottom of said portion 110 for the purpose of elevating and lowering member 108. On the elevating of member 108 the gear 125, due to the engagement therewith of the teeth 112, will be moved in an anti-clockwise direction shifting the crank arms 115 rearwardly which in turn will carry the coupling bars 123 and impulse arms 119 therewith whereby the holders 28 will be moved in a clockwise direction, but the pawl 40ª will prevent the core 29 from moving in such direction with the holders 28. When the member 108 lowers, the gear 125 will be revolved by teeth 112 in a clockwise direction whereby the crank arms 115 will be shifted forwardly moving the coupling bars 123 in a like direction which in turn will act on the arms 119 in a manner whereby said arms 119 will move the holders 28 and core 29 in an anti-clockwise direction to an extent to position a slot 37 at a point to receive a part of the strip 60. The mechanisms 107 act to alternately give a clockwise and anti-clockwise impulse to or oscillate the holders to successively position the slots 37 of the core 29 to be insulated.

Revolubly mounted in a bifurcated supporting means 129 at the upper portion of the front of structure 23 is a shaft 130 which carries a roll 131 of strip 60. The latter winds off roll 131 and passes around a guide roller 132 carried by a support 133 arranged below said means 129. The support 133 is secured to structure 23.

What I claim is:

1. In a machine for lining the walls of the slots of an armature core with a strip of insulation, a pair of oscillatory core holders for intermittently revolving, on one direction of the movement thereof, the core to successively position the slots of the latter to receive portions of said strip, means to prevent the revolving of the core during the other direction of movement of said holders, a reciprocatory inserter-element for successively inserting said strip portions into the core slots, a pair of oppositely movable horizontally disposed simultaneously operable reciprocatory former-elements for simultaneously extending into and out of each of the inserted portions of the strip, said former-elements including means acting on said strip portions to provide for the latter to snugly engage the walls of the slots, said former-elements being bodily carried with and extending through said holders, cam actuated mechanisms for intermittently oscillating said holders, a cam actuated mechanism for operating said inserter-element at the end of each intermittent impulse to the core, cam actuated mechanisms for said former-elements as the inserter-element passes from the slots of the core between the intermittent oscillation of the holders, actuating cams for said mechanisms, and an operating shaft common to said cams.

2. In a machine for lining the walls of the slots of an armature core with a strip of insulation, a pair of oscillatory core holders for intermittently revolving, on one direction of movement thereof, the core to successively position the slots of the latter to receive portions of said strip, means to prevent the revolving of the core during the other direction of movement of said holders, a reciprocatory inserter-element for successively inserting said strip portions into the core slots, a pair of oppositely movable horizontally disposed simultaneously operable reciprocatory former-elements for simultaneously extending into and out of each of the inserted portions of the strip, said former-elements including means acting on said strip portions to provide for the latter to snugly engage the walls of the slots, said former-elements being bodily carried with and extending through said holders, cam actuating mechanisms for intermittently oscillating said holders, a cam actuated mechanism for operating said inserter-element at the end of each intermittent impulse to the core, cam actuated mechanisms for operating said former-elements as the inserter-element passes from a slot of the core between the intermittent oscillation of the holders, and the said cam actuated mechanisms for said holders including means for varying the extent of the oscillation imparted to the holders.

3. In a machine for lining the walls of the slots of an armature core with a strip of insulation, a pair of oscillatory core holders for intermittently revolving the core to successively position the slots of the latter to receive portions of said strip, a reciprocatory inserter-element for successively inserting said strip portions into the core slots, a pair of oppositely movable horizontally disposed simultaneously operable reciprocatory former-elements for simultaneously extending into and out of each of the inserted strip portions, said former-elements including means acting on said strip portions to provide for the latter to snugly engage the walls of the slots, a supporting structure for said holders, said inserter-element and said former-elements, said holders being arranged in spaced relation and revolubly connected to the sides of said structure, said inserter-element being arranged within the upper portion of said structure and over the core supported by the holders, and said pair of former-elements, each being arranged on the outer face of a side of said structure in juxtaposition to a holder.

4. In a machine for insulating the walls of the slots of an armature core with a strip of insulation, a pair of oscillatory core holders for intermittently revolving, on one direction of movement thereof, the core to successively position the slots of the latter to receive portions of said strip, means to prevent the revolving of the core during the other direction of movement of said holders, a reciprocatory inserter-element for successively inserting said strip portions into the core slots, a pair of oppositely movable horizontally disposed simultaneously operable reciprocatory former-elements for simultaneously extending into and out of each of the inserted portions of said strip, said former-elements including means acting on said strip portions to provide for the latter to snugly engage the walls of the slot, said former-elements being bodily carried with and extending through said holders, and said holders being formed with openings for the passage therethrough of said former-elements.

5. In a machine for insulating the walls of the slots of an armature core with a strip of insulation, a pair of oscillatory core holders for intermittently revolving, on one direction of movement thereof, the core to successively position the slots of the latter to receive portions of said strip, means to prevent the revolving of the core during the other direction of movement of said holders, a reciprocatory inserter-element for successively inserting said strip portions into the core slots, a pair of oppositely movable horizontally disposed simultaneously operable reciprocatory former-elements for simultaneously extending into and out of each of the inserted portions of said strip, said former-elements including means acting on said strip portions to provide for the latter to snugly engage the walls of the slot, said former-elements being bodily carried with and extending through said holders, said holders formed with openings for the passage therethrough of said former-elements, a supporting structure for said holders, said inserter-element and said former-elements, said holders being arranged in spaced relation and revolubly connected to the sides of said structure, said inserter-element being arranged within the upper portion of said structure and over the core supported by said holders, and each of said former-elements being arranged on the outer end of and bodily carried with a holder.

6. In a machine for insulating the walls of the slots of an armature core with a strip of insulation, a pair of oscillatory core holders for intermittently revolving, on one direction of movement thereof, the core to successively position the slots of the latter to receive portions of said strip, means to prevent the revolving of the core during the other direction of movement of said holders, a reciprocatory inserter-element for successively inserting said strip portions into the core slots, a pair of oppositely movable horizontally disposed simultaneously operable reciprocatory former-elements for simultaneously extending into and out of each of the inserted portions of said strip, said former-elements including means acting on said strip portions to provide for the latter to snugly engage the walls of the slot; said former-elements being bodily carried with and extending through said holders, a supporting structure common to said holders, inserter-element and former elements, cam actuated mechanisms positioned adjacent the outer faces of the sides of said structure for simultaneously oscillating said holders, a cam actuated mechanism arranged within and extended from said structure for reciprocating the inserter-element, and cam actuated mechanisms arranged adjacent the outer face of the sides of said structure for reciprocating said former elements.

7. In a machine for insulating the walls of the slots of an armature core with a strip of insulation, a pair of oscillatory core holders for intermittently revolving, on the anti-clockwise movement thereof, the core anti-clockwise to successively position the slots of the latter to receive portions of said strip, a reciprocatory inserter-element for successively inserting said strip portions in said slots, a pair of oppositely movable simultaneously operable reciprocatory former-elements acting on said strip portions to have them conform to the shape of the slots, a structure including means to arrest clockwise movement of the core on the clockwise movement of the holders, and said structure including a roller for smoothing and holding the strip on the core.

8. In a machine for lining the walls of the slots of an armature core with a strip of insulation, a pair of oscillatory core holders, the movement of said holders anti-clockwise intermittently revolving the core anti-clockwise to successively position the slots of the latter to receive portions of the strip, a reciprocatory inserter-element for successively inserting said strip portions in said slots, a pair of oppositely movable simultaneously operable reciprocatory former-elements acting on said strip portions to have them conform to the shape of the slots, a structure including means to arrest clockwise movement of the core on clockwise movement of the holders, said former-elements being bodily carried with the holders and operating through the latter, intermittently operable means for oscillating the holders, intermittently operable means for operating the inserter-element, and intermittently operable mechanisms for operating the former-elements.

9. In a machine for lining the walls of the slots of an armature core with a strip of insulation, a pair of oscillatory core holders, the movement of said holders anti-clockwise intermittently revolving the core anti-clockwise to successively position the slots of the latter to receive portions of said strip, a reciprocatory inserter-element for successively inserting said strip portions in said slots, a pair of oppositely movable simultaneously operable reciprocatory former-elements acting on said strip portions to have them conform to the shape of the slots, a structure including means to arrest clockwise movement of the core on the clockwise movement of the holders, said former-elements being bodily carried with the holders and operating through the latter, intermittently operable means for oscillating the holders, intermittently operable means for operating the inserter-element, intermittently operable mechanisms for operating the former-elements, and an operating shaft common to said pair of intermittently operable means and the said mechanisms, said shaft being provided with spaced cam means for successively respectively operating the operating means for the holders, the operating means for the inserter-element and the operating mechanisms for the former-elements.

10. In a machine for insulating the walls of the slots of an armature core with a strip of insulation, a pair of oscillatory core holders for intermittently revolving during the anti-clockwise movement thereof the core anti-clockwise to successively position the slots of the latter to receive portions of said strip, a reciprocatory inserter-element for successively inserting said strip portions in said slots, a pair of oppositely movable simultaneously operable reciprocatory former-elements acting on said strip portions to have them conform to the shape of the slots, a structure including means to arrest clockwise movement of the core on the clockwise movement of said holders, said former-elements being bodily carried with the holders and operating through the latter, intermittently operable means for operating the holders, intermittently operable means for operating the inserter-element, and intermittently operable mechanisms for operating the former-elements, the said operating means for the holders being adjustable for varying the extent of the oscillations imparted to the holders.

JOHN T. McCAFFREY.